United States Patent Office 2,871,763
Patented Feb. 3, 1959

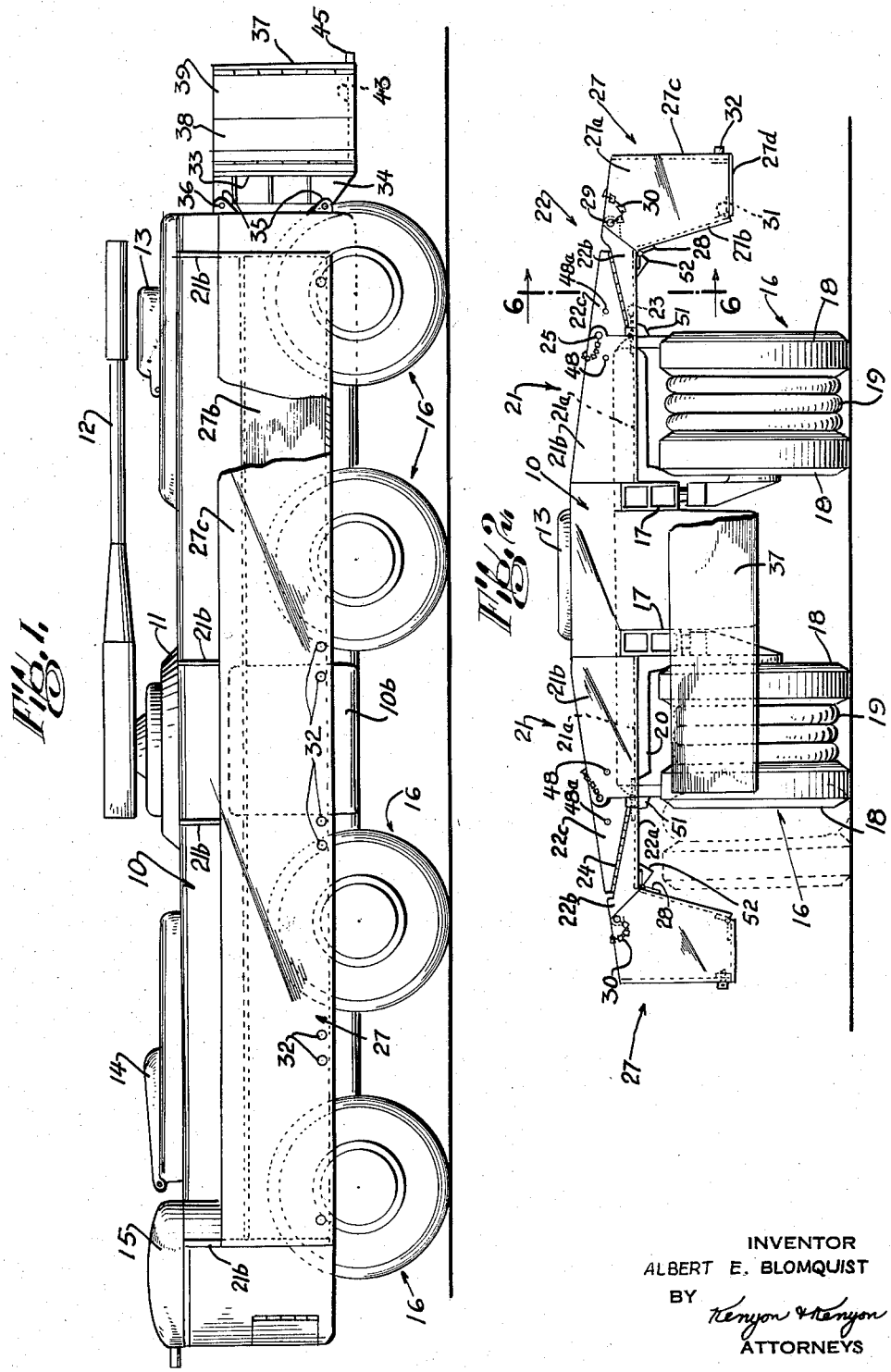

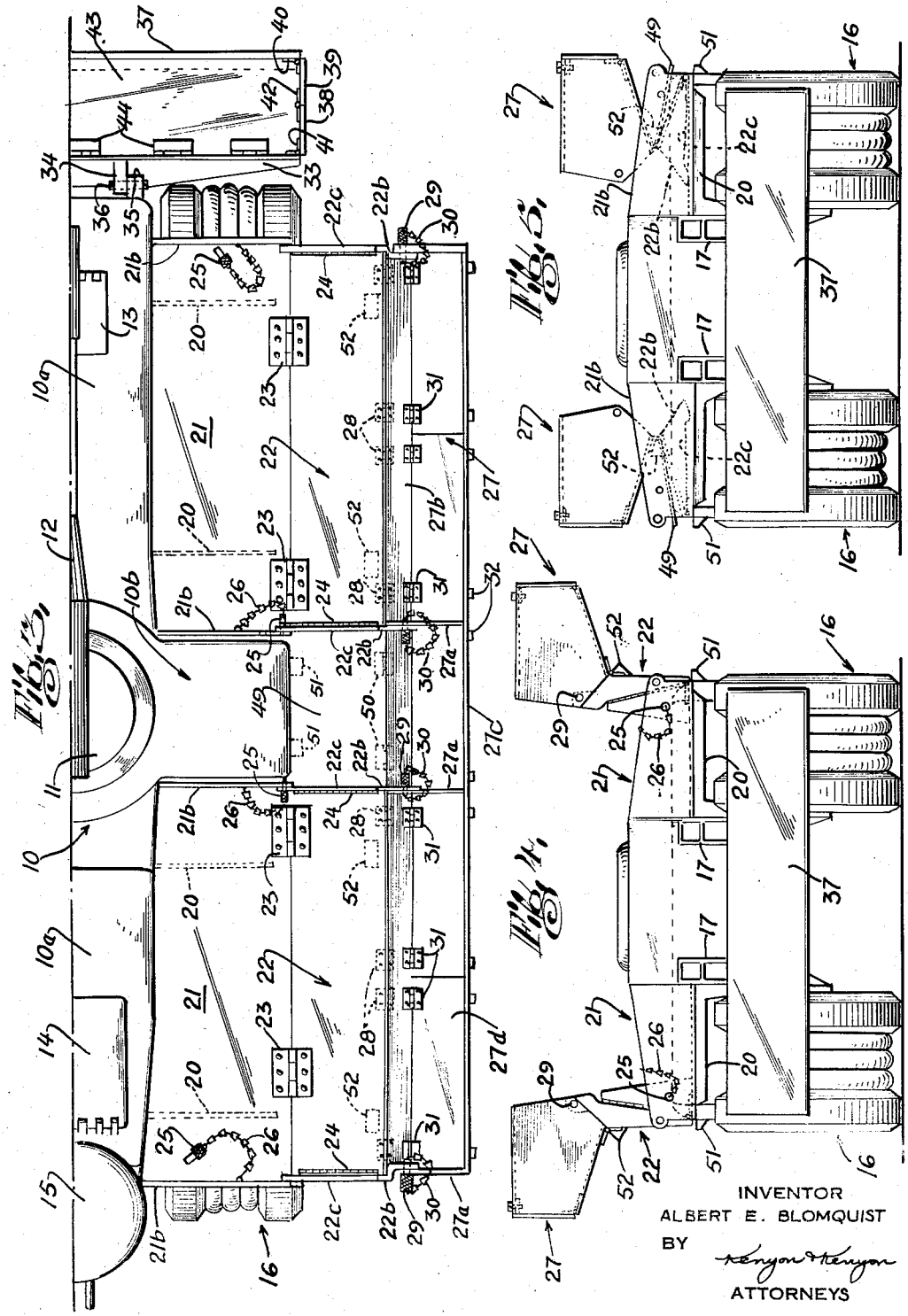

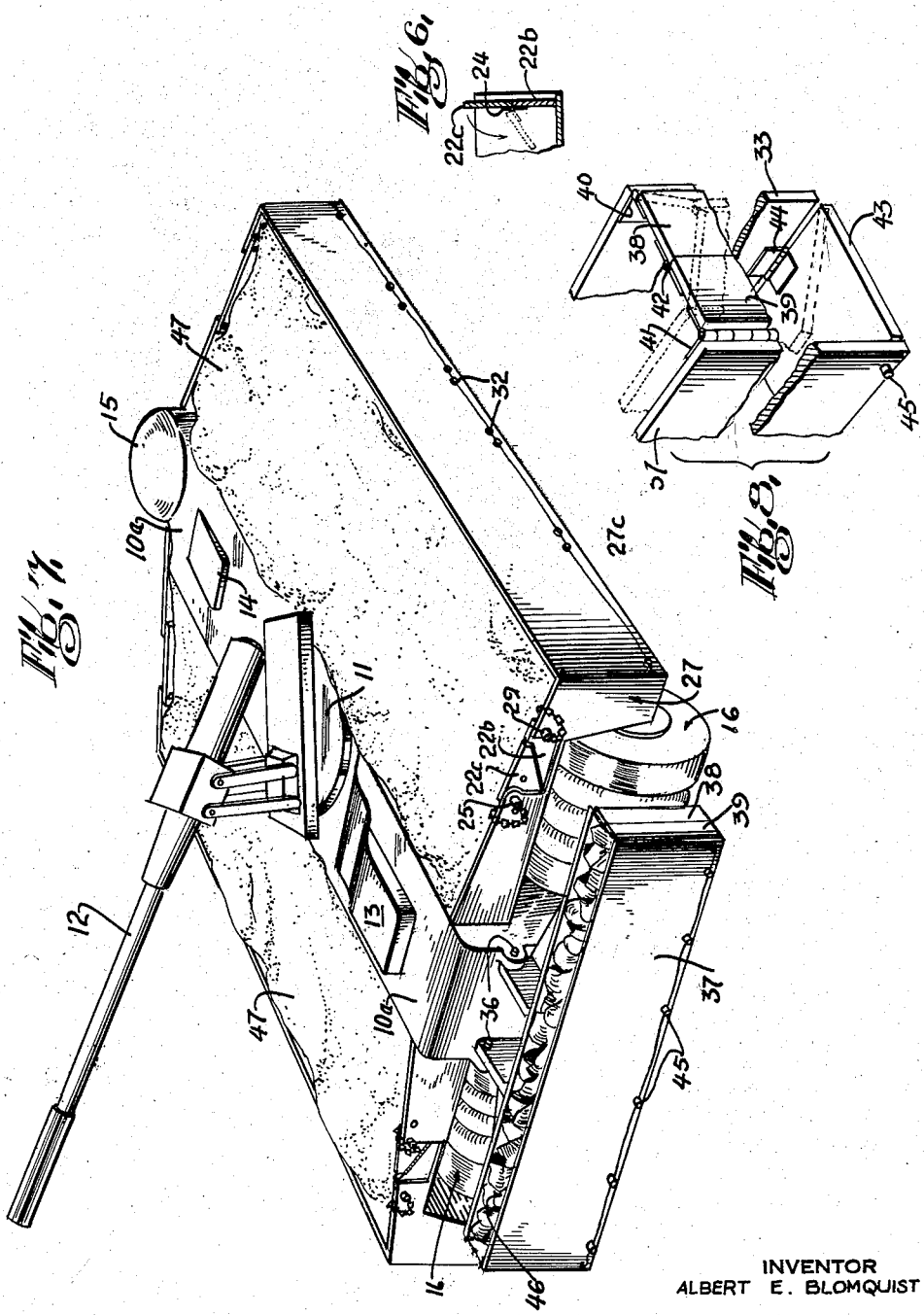

2,871,763

VARIABLE ARMORED SECTIONS FOR VEHICLES

Albert E. Blomquist, Ringoes, N. J., assignor to Fairchild Engine and Airplane Corporation, Hagerstown, Md., a corporation of Maryland Application May 17, 1955, Serial No. 508,925

7 Claims. (Cl. 89—36)

This invention relates to armored vehicles.

It is an object of this invention to provide an armored vehicle which can be readily transported by any means including air and which when approaching a combat area is such that its effective armor can be readily increased. It is a further object of this invention to provide an armored vehicle whose armor means may be varied depending on the nature of the operation for which it is being used. It is a further object of this invention to provide armor effective for protecting the wheels or other carrying means of a vehicle.

Armored vehicles have been extensively used by the military forces. However, armor effective for use in a combat area is of such weight as to be a decided drawback under other circumstances as, for example, during movement under its own power or during shipment by rail, ship or airplane. Moreover, in such vehicles armor effective for protecting the body of the vehicle usually is so localized as to be without effectiveness for other purposes.

It is a feature of this invention that vehicle armor means is provided which may be secured to a vehicle body along and adjacent a margin thereof so as to be in movable relation thereto whereby armor effective during combat may also be effective in another position and during other uses of the vehicle, e. g., in the transportation of personnel or equipment. It is a further feature of this invention that the armor means is so constructed as to be movable from a folded or contracted position to a laterally extended position in which it is adapted to retain therein a body of friable aggregate material which greatly increases the effective armor so as to make the vehicle better able to withstand combat conditions. By thus having the capacity to utilize a friable aggregate material, increased effectiveness of armor is made possible after the vehicle has been brought to a zone of combat merely by utilizing a material that normally is readily available wherever the vehicle may be, such as earth, sand, gravel, stone, logs and the like. Because the armor means is such that its effectiveness may be readily increased after it has been moved to combat area, the armor means as installed at the factory may be made relatively light, thus facilitating transportation of the vehicle either under its own power or when carried bodily by a conveyance therefor.

Further features of this invention reside in the provision of armor means comprising a plurality of articulated sections whereby the armor means may be folded or contracted when not being used in conjunction with retained friable aggregate material, thus facilitating transport and storage. Moreover, when the armor means has been moved to the position which it occupies when in the folded or contracted position, it is a further feature of this invention that it is disposed so as to be effective as a light armor for protecting personnel and equipment when the vehicle is being used as a transport in an area which may be outside an active combat area but within which there is such danger as to make at least light armor advisable.

Further features of preferred embodiments of this invention relate to the provision of armor means comprising a plurality of sections articulated about first and second hinge means disposed in substantial parallelism to a margin of the body of the vehicle. Preferably the sections of the armor means are articulated for movement from an upstanding position to a laterally extending position at which it is adapted to retain friable aggregate material, and the outermost section is provided with a trough that overhangs the wheels or other carrying means that is disposed along each side of the body of the vehicle.

The foregoing and other objects, features and advantages of the invention will be apparent from the following description of an embodiment of this invention which is illustrative of a typical and preferred construction, the description being in connection with the accompanying drawings, wherein:

Fig. 1 is a side view of an armored vehicle embodying this invention with both the side and front armor means shown in position for receiving and retaining friable aggregate material, a portion of the side armor means being broken away;

Fig. 2 is a front view of the vehicle shown in Fig. 1, with a portion of the front armor means broken away;

Fig. 3 is half plan view of the vehicle, the other half being the complement of that shown;

Fig. 4 is a front view of the vehicle with the sections of the side armor means in one upstanding position at which they can be maintained;

Fig. 5 is a front view of the vehicle with the sections of the side armor means more completely folded so as to assume another upstanding position at which they can be maintained;

Fig. 6 is a detail sectional view taken on the line 6—6 of Fig. 2;

Fig. 7 is a perspective view of the vehicle showing the armor means extended and filled with a friable aggregate material; and Fig. 8 is a perspective detail end view of one end of the front armor means, the vertically disposed walls thereof being centrally broken away.

While armor according to and embodying this invention may be comprised in a wide variety of vehicles, it has been shown for illustrative purposes as being comprised in a self-propelled vehicle adapted for carrying certain weapons including a cannon mounted on a turret. The body of the vehicle is indicated by the reference character 10 and comprises the relatively narrow end portions 10a and the wider central portion 10b. The turret 11 for the cannon 12 is disposed centrally in the vehicle body and on each side thereof in the wider central portion 10b of the body an internal combustion engine may be mounted for propelling the vehicle as, for example, by operating electric generator means which supplies electric current for operating electric motor means mounted within the individual wheels, as well as other power actuated mechanisms comprised in the vehicle. The interior of the front portion 10a of the body may be made accessible through the hatch-like cover 13 for an operator in charge of controls located in this portion of the vehicle, such as the steering mechanism, and the motor, gear and clutch controls. A similar hatch-like cover 14 provides access through which an operator may enter the rear end portion 10a of the vehicle for operating controls located therein such as the loading and firing controls for the cannon 12 and for the small gun turret 15 at the rear of the vehicle.

In the embodiment shown the carrying means for the vehicle consists of eight wheels 16, four being disposed on each side as most clearly shown in Figs. 1 and 2. Each wheel 16 is secured to the body 10 by resilient shock absorbing means 17 which preferably is constructed as disclosed in my application Serial No. 366,720 filed July 8, 1953, now Patent No. 2,720,274. The wheels 16 are preferably axially expandable as disclosed in my application Serial No. 360,908 filed June 11, 1953, now Patent No. 2,751,959, each wheel as so constructed having two inflated tires 18 and a third tire 19 which is inflatable when the wheel is expanded to the positions indicated by dotted lines at the lefthand side of Fig. 2. In such a wheel, rotation thereof for propelling the vehicle may be effected by means of a motor comprised in the wheel itself, as for example an electric motor that is supplied with electric current through electrical conductors (not shown) that pass from the body 10 through the resilient means 17 to the wheel 16.

While a specific carrying means has been described above, it is to be understood that this has been done merely by way of illustration and that any suitable carrying means may be employed such as wheels otherwise mounted, caterpillar tread means, or other rotatably mounted carrying means, or even runners. However, it is significant that the armor means that is employed according to this invention is adapted to provide effective protection not only for the vehicle body but also for body-carrying means that comprises inflated tires even when tires are mounted on wheels of the expandable type above referred to.

The armor means as exemplified by and comprised in the vehicle shown in the drawings is composed of a plurality of articulated sections. The armor means secured to the sides of the body 10 will first be described.

For securing the side armor means to the body 10 along and adjacent the side margins thereof the bracket members 20 are employed which support in rigid relation to the body 10 the armor sections that are indicated generally by the reference character 21 and that are disposed so as to extend laterally from the sides of end portions 10a of the body 10. These laterally disposed sections 21 comprise the bottom plates 21a and the upstanding transverse wall members 21b adjacent each end.

The armor means along each margin of the body 10 comprises first and second movable sections which are successively pivotally secured by first and second hinge means that in the embodiment shown are disposed in substantial parallelism to the side margins of the body. On each side of the body there are first movable sections which are indicated generally by the reference character 22 and which correspond in length to the fixed laterally extending sections 21. The sections 22 are pivotally connected to the sections 21 by the hinges 23 and comprise the panel 22a which provides the bottom of protective container means when the armor sections are in the position shown in Figs. 2 and 3. The sections 22 also comprise at each end an end wall composed of two parts, one part 22b being rigidly secured to the panel 22a and the other part 22c being secured to the part 22b by the diagonally disposed hinge 24 as shown especially in Figs. 2, 3 and 6. The hinge 24 permits the wall part 22c to be folded inwardly, as shown in Fig. 6, along the diagonally disposed hinge 24 for the purpose to be described hereinbelow in connection with Figs. 4 and 5. The end of each of wall parts 22c overlaps with the end of each of the end walls 21b when the sections 22 are in the extended position; and to prevent sagging of the sections there are holes in the overlapping portions of these parts that register when the parts are in the desired extended positions and through which the pins 25 may be passed. The pins are adapted to be readily inserted and removed whenever desired and if desired to prevent loss they may be attached to the ends of chains 26, the other ends of which are attached at some convenient point as to the walls 21b as shown. In Fig. 3 two pins 25 have been shown removed and two pins 25 have been shown in place so as to illustrate more clearly their use as readily releasable fastening means, but normally they are all in inserted position when the sections of the armor means are in position for retaining friable aggregate material therein.

The second movable section of the armor means is of such configuration as to provide a trough that overhangs the wheels on each side of the vehicle body and that is generally indicated by the reference character 27. The armor section 27 comprises the transverse wall members 27a that are rigidly secured to the inner wall 27b and to the outer wall 27c of the trough. The trough-shaped armor section 27 extends throughout the length of the side margin of the vehicle body and the upper margin of the inner wall 27b thereof is secured to the margin of armor sections 22 by the hinges 28. To prevent sagging of the trough, apertures are provided in the walls 22b and 27a which register when the armor sections are in extended position and through which removable pins 29 may be passed that are attached to the ends of the chains 30. For facilitating the quick discharge of friable aggregate material from the extended armor sections the bottom of the trough-shaped armor section 27 is provided with dumping panels 27d which are hingedly secured along one margin to the wall member 27b by the hinges 31 and the opposite margins of which can be held in place by the pins 32 which are readily removable to permit the opening of the dumping panels 27d for quick discharge of friable aggregate material from the trough member 27.

In order to retain friable aggregate material in the zone between the inner ends of the armor sections 22 and between the side central portion 10b of the body 10 and the trough 27, a panel 49 is secured to the inner margin of the trough 27 by the hinges 50 as shown in Fig. 3. The other margin of the panel 49 is not secured to the margin of the side central portion 10b of the body but merely rests in the lugs 51 that protrude from and are secured to the side portion 10b so that the panel 49 may rest thereon at substantially the plane of the bottom 22a of the armor sections 22. The panel 49 is not directly secured to the side central portion 10a of the body because in usual design of the vehicle body the side central portion 10b of the vehicle is disposed somewhat higher than the bottoms 21a of the armor sections 21. Notwithstanding this fact, the armor sections can be folded to the positions shown in Figs. 4 and 5 by mounting the panel 49 in the manner described.

The front of the vehicle body also carries armor means which is adapted to retain friable aggregate material and which comprises sections that are articulated so that they may be folded to a relatively contracted position when the vehicle is not being used in a combat area. As shown particularly in Figs. 1, 2 and 8, the front armor means is trough-like and comprises a back section 33 that is firmly secured to the vehicle body by the bracket members 34 and 35 which are secured together by the pins 36. The front wall or section 37 is held by the back section 33 by means of the end wall parts 38 and 39 which are hingedly secured to the rear and front walls 33 and 37 respectively by the hinges 40 and 41 respectively and which are hingedly secured to each other by the hinges 42. The bottom of the trough-like front armor means is provided by the bottom panel 43 which is hingedly secured to the fixed back section 33 by the hinges 44 so that it can be either raised or dropped for dumping. The forward end may be held in position adjacent the bottom of the front panel 37 as by the removable pins 45. When so secured, the end wall parts 38 and 39 are held in alignment as shown in Fig. 8 and the front armor means may be filled with a friable aggregate material 46 as shown in Fig. 7 in order to increase the effectiveness thereof. When the friable aggregate material is not needed the pins 45 can be removed, thereby permitting the bottom panel 43 to be dropped for dumping the aggregate. By then folding the panel 43 upwardly into face-to-face relation with the back section 33, the front section 37 may be moved toward the rear section 33 with accompanying outward folding of the end wall parts 38 and 39 as shown in dotted lines in Fig. 8. The front armor means thereby can be folded to more compact position for facilitating transport and storage and in such position provides protective armor which is lighter than when the parts are extended to provide a container filled with friable aggregate material.

Fig. 7 illustrates the appearance and utility of the side armor means when in extended position wherein the effectiveness of the metal of which the sections of the armor means is composed is greatly increased by its serving as a protective container means for the friable aggregate material 47. As indicated in Fig. 2 as well as Fig. 7, the side armor means in this position effectively protects both the side walls of the vehicle body and the carrying means for the body, i. e., the wheels 16 having the pneumatic tires 18 and 19 mounted thereon. In addition when earth, gravel or the like is employed it is effective as a camouflage. Upon entering a combat zone it is a relatively simple matter to dispose the side armor section in the extended position and load friable aggregate material therein which, as long as it is retained, serves its purpose while the mobility of the vehicle is retained. When the friable aggregate material is no longer needed it is also a simple matter to dump it and fold the armor section to a more compact position.

Figs. 4 and 5 illustrate the position and utility of the side armor means when not in extended position adapted to retain the friable aggregate material. In Fig. 4 the relative positions of the armor sections 22 and 27 are the same as shown in Figs. 1, 2, 3 and 7, but both of these sections have been pivoted about the hinges 23 so as to assume the upstanding position shown. When in this position the openings 48 and 48a with which the pin 25 also is adapted to fit come into registration so that the armor sections may be retained in the position shown by inserting the pin 25 through these openings when they have been brought into registration. When the sections of the side armor means are in the position shown in Fig. 4 the vehicle, being much lighter because of the absence of the friable aggregate material, is suitable for use as a transport for personnel, equipment, etc., which can be carried on the top of the body and in the sections 21 of the armor means in a way which is essentially similar to the use of an open-bodied truck. In addition, the personnel, equipment or the like that is being transported is given a substantial amount of protection by upstanding armor sections 22 and 27.

In addition to the position of the armor sections shown in Fig. 4, the armor sections may be folded further to the still more compact position shown in Fig. 5 by removing the pins 25 and 29 and folding the part 22c of the transverse walls inwardly to the position shown in dotted lines in Fig. 6. In such position, the armor sections can become folded to a very compact position, and in addition the parts 22b of the armor section 22 serve to maintain the parts stably supported with the trough 27 clearing the side central part 10b of the body. To assist in keeping the trough 27 in the position shown, any suitable means can be used such as the lugs 52 secured to the wall parts 22b. The disposition of the sections of the armor means as shown in Fig. 5 is that normally used during storage or transport, for the parts as thus disposed are in their most compact position.

While this invention has been described in connection with a specific embodiment thereof, it is to be understood that this has been done for illustrative purposes and so that this invention may be better understood by reference to a typical and preferred embodiment. Thus the nature and shape of the articulated sections will vary depending on the type of vehicle with which the armor is comprised. Moreover, the constructional details may be varied.

I claim:

1. A vehicle comprising a body, carrying means for said body, and protective armor means secured to said body along a margin of said body, said protective armor means being secured to said body by substantially horizontally pivoted hinge means for pivotal movement about said hinge means between upstanding position and laterally disposed position extending outwardly from said body, and means for maintaining said protective armor means in each of said positions, said protective armor means comprising a trough when said protective armor means is in said laterally disposed position which is disposed alongside said body and is adapted to contain a friable aggregate material for providing additional armor effective for protecting said body.

2. A vehicle comprising a body, carrying means for said body, and protective armor means secured to said body along a margin of said body, said protective armor means comprising a first movable section mounted for pivotal movement relative to said body about first hinge means substantially parallel to said margin of said body, a second section secured to said first section and mounted for pivotal movement relative to said first section about second hinge means substantially parallel to said first hinge means, said first and second sections being pivotally movable about said first hinge means between upstanding position and laterally disposed position extending outwardly from said body, said first and second sections being pivotally movable relative to each other about said second hinge means between folded relation in proximity to each other when said sections are in said upstanding position and more extended relation when in said laterally disposed position, means for maintaining said sections in said upstanding and laterally disposed positions respectively, and said first and second movable sections when in said laterally disposed position being adapted to contain a friable aggregate material therein for providing additional armor protection effective for protecting said body.

3. A vehicle comprising a body, carrying means for said body, and protective container means secured to said body along each side thereof, said protective container means secured to each side of said body comprising a first movable section pivotally mounted relative to a side of said body by first longitudinally disposed hinge means and a second movable section pivotally mounted relative to said first section by second longitudinally disposed hinge means, said first and second movable sections being foldable about said first and second hinge means between a contracted position in adjacent relation to said body and an extended position at which said container means is adapted to retain friable aggregate material therein for providing protective armament, and readily releasable means for maintaining said sections in extended position.

4. A vehicle comprising a body, carrying means for said body and protective armor means secured to said body along and adjacent a margin of said body, said protective armor means comprising a laterally disposed section secured to a wall of said body, a first movable section pivotally secured by first hinge means to said laterally disposed section adjacent the margin thereof remote from said wall of said body, a second movable section pivotally secured by second hinge means to said first movable section adjacent the margin thereof remote from said laterally extending section, said first and second movable sections being foldable about said hinge means from a contracted position overlying said laterally disposed sections to a position extending laterally from said laterally disposed section, and readily releasable means for holding said first and second movable sections in said laterally extended position, said protective container means comprising said laterally disposed section and said first and second movable sections being adapted to retain a friable aggregate material therein when said first and second movable sections are in said extended position.

5. A vehicle according to claim 5 wherein said first movable section comprises a wall member which is disposed transversely thereof in upstanding position when said section is disposed in laterally extended position and which comprises a hinge disposed diagonally thereof from adjacent the bottom thereof at the end thereof proximate to said first hinge means to adjacent the top thereof at the end thereof proximate to said second hinge means so that a portion of said wall member is foldable along said hinge means from position substantially in the plane of the other portion through at least about 90° so that folding of said first movable section about said first hinge means is permitted when said foldable portion of said wall member is folded so as to be at least about 90° from the plane of the other portion and is positively limited by said wall members when said second hinge is spaced from substantially disposed section by a distance corresponding at least approximately to the height of said wall.

6. A vehicle comprising a body, rotatably mounted carrying means disposed on each side of said body for carying said body and protective armor means secured to said body along each side thereof, said protective armor means secured to each side of said body comprising a section secured to said body so as to be disposed laterally above said carrying means, a first movable section pivotally secured by hinge means to said laterally disposed section adjacent the margin thereof remote from said side of said body, a second movable section pivotally secured by second hinge means to said first movable section adjacent the margin thereof remote from said laterally extending section, said first and second movable sections being foldable about said hinge means from contracted position overlying said laterally disposed section to position laterally disposed overlying said carrying means and said second movable section comprising a trough adapted to substantially overhang said carrying means to provide protection therefor when said first and second movable sections are in extended position, and readily releasable means for maintaining said first and second movable sections in said extended position, said protective armor means comprising said laterally disposed section and first and second movable sections and said trough being adapted to retain therein friable aggregate material when said first and second sections are maintained in said extended position.

7. A vehicle comprising a body, carrying means for said body, and protective armor means secured to said body along and adjacent a margin thereof comprising a trough-shaped container disposed alongside said body so as to cover at least a substantial portion of said body and adapted for retaining therein a loose friable aggregate material, said container comprising a plurality of sections connected by hinge means for articulated relative movement between an extended position wherein said trough-shaped container is disposed as aforesaid constituted by said sections and a contracted position closer to said body unsuited for retention of loose aggregate material as aforesaid, and means for maintaining said sections in each of said relative positions.

References Cited in the file of this patent

UNITED STATES PATENTS

| | | |
|---|---|---|
| 1,266,196 | Bentley | May 14, 1918 |
| 1,287,845 | Bidwell | Dec. 17, 1918 |
| 2,200,230 | Hojnowski | May 7, 1940 |
| 2,376,331 | Abrams | May 22, 1945 |

FOREIGN PATENTS

| | | |
|---|---|---|
| 789,475 | France | Aug. 19, 1935 |
| 865,365 | France | Feb. 24, 1941 |
| 542,351 | Great Britain | Jan. 5, 1942 |

UNITED STATES PATENT OFFICE

CERTIFICATE OF CORRECTION

Patent No. 2,871,763                  February 3, 1959

Albert E. Blomquist

It is hereby certified that error appears in the printed specification of the above numbered patent requiring correction and that the said Letters Patent should read as corrected below.

Column 7, line 5, for "to claim 5" read -- to claim 4 --.

Signed and sealed this 30th day of June 1959.

(SEAL)
Attest:

KARL H. AXLINE
Attesting Officer

ROBERT C. WATSON
Commissioner of Patents